March 1, 1927.  L. W. RICHARDS  1,619,039

BRAKE

Filed March 8, 1926

Inventor
LESLIE W. RICHARDS

By
Attorney

Patented Mar. 1, 1927.

1,619,039

UNITED STATES PATENT OFFICE.

LESLIE W. RICHARDS, OF ST. LOUIS, MISSOURI, ASSIGNOR TO ST. LOUIS CAR COMPANY, OF ST. LOUIS, MISSOURI, A CORPORATION OF MISSOURI.

BRAKE.

Application filed March 8, 1926. Serial No. 93,314.

This invention relates to brakes and more particularly to brakes of the drum type.

An object of the invention is to provide improved means for anchoring a brake on a railway car truck or other vehicle.

A further object is to provide improved adjusting means for the brake.

A further object is to provide improved means for equalizing the action of the brake shoe.

In constructing the brake I provide a fulcrum bracket which is adapted to embrace a projection on the journal box or other support and is free to rotate. This bracket is anchored by means of links to a portion of the truck frame, the whole being arranged to permit vertical movement of the axle, and at the same time keep the brake gear concentric with it.

Figure 1:
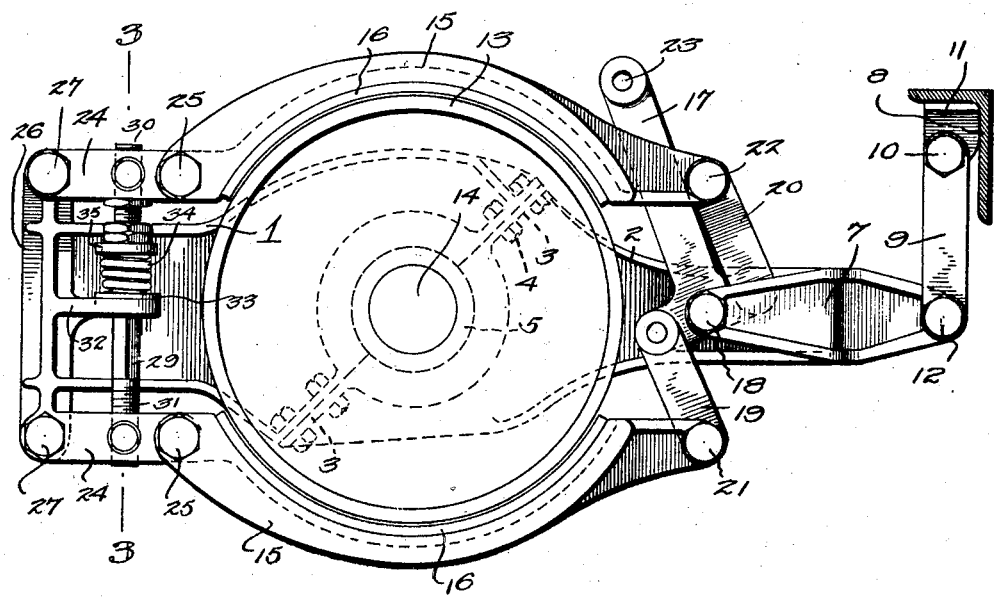
Figure 2:
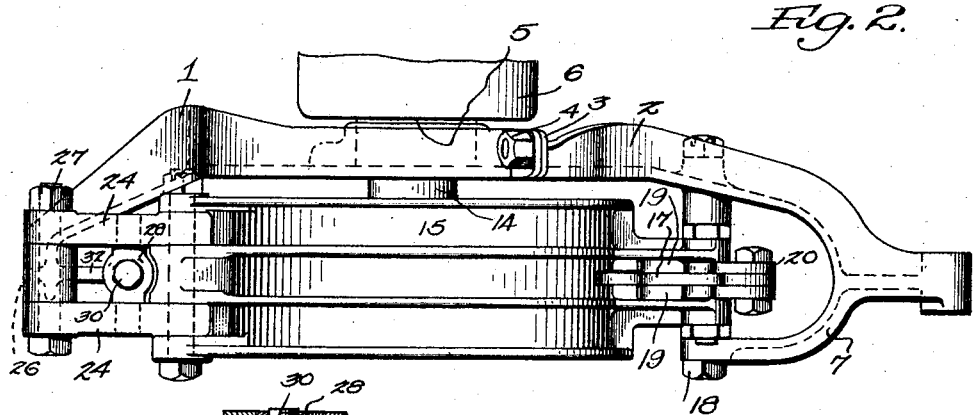
Figure 3:
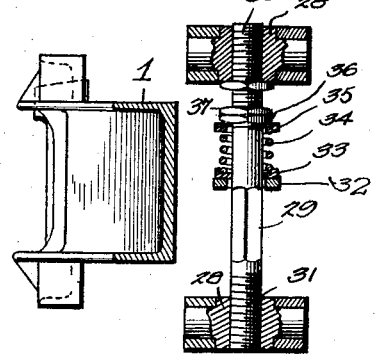

In the accompanying drawings I have shown one embodiment of the invention. In this showing, Figure 1 is a side view, Figure 2 is a plan view, and Figure 3 is a vertical sectional view on line 3—3 of Figure 1.

Referring to the drawings the bracket consists of a pair of plates 1 and 2 which are provided with flanges 3 adapted to be bolted to each other as at 4 and which is adapted to embrace a projection 5 on a journal box 6 and to revolve with relation thereto. The plate 2 is provided with an arm or extension 7 adapted to be connected to a portion of the truck frame as indicated at 8 by means of a link 9. As shown, the link is pivotally connected at 10 to an ear 11 formed on the cross member and is likewise pivotally connected to the arm 7 at 12. As will be apparent, the connection of the link 9 with the bracket causes the latter to partake of a relative rotating movement with respect to the axle upon the vertical movement of the axle with respect to the car.

A brake drum 13 is secured to the axle 14 and brake shoes 15 embrace the drum. These shoes may be provided with suitable friction linings 16 formed of metal, fabric, or other suitable material. A brake lever 17 is pivotally mounted on the plate 2 of the bracket as indicated at 18 and is connected to links 19 and 20 at its opposite ends. These links are in turn connected to the adjacent ends of the brake shoes as at 21 and 22. The brake lever is connected to an air cylinder (not shown) or hand brake (not shown) by any suitable connecting means and the connecting means is secured to the brake lever at 23.

The opposite end of each brake shoe is connected to a link 24 as indicated at 25 and these links are pivotally mounted on an extension 26 of the plate 1 as at 27. The links are thus free to revolve about the pivots 25 and 27. A trunnion 28 is connected to each of these links intermediate its ends and these trunnions are provided with threaded openings (see Figure 3) and are adapted to receive the threaded ends of a rod 29. As shown, the upper end 30 of the rod is provided with right hand threads and the lower end 31 is provided with left hand threads. The arm 26 is provided with a horizontal extension 32 having a slot in its outer end for the reception of the rod 29. Above this member I provide a washer 33 and a coil spring 34 is arranged around the rod above the washer. A similar washer 35 is arranged over the spring and the tension of the spring is maintained by means of a nut 36 and a lock nut 37.

In operation, the brake lever 17 is actuated in the usual manner to cause the links 19 and 20 to pull the brake shoes into engagement with the drum. The links 24 at the opposite ends of the brake shoes provide floating fulcrums which are connected by means of the rod 29 but which are free to move vertically to compensate for unequal loading of the two brake shoes. This is accomplished by the pivotal connections 27 at the outer ends of the links. The rod 29 being provided with right and left hand threaded ends, not only forms a tie between the two brake shoes, but also provides a means of adjustment for taking up the wear on the shoes and drum. The spring 34 supports the upper shoe when in released position and maintains it clear of the drum.

It is to be understood that the form of my invention herewith shown and described is to be taken as a preferred example of the same and that various changes in the shape, size, and arrangement of parts may be resorted to without departing from the spirit of the invention or the scope of the subjoined claims.

I claim:

1. In a device of the character described, a drum, a bracket mounted concentrically with said drum, said bracket being free to rotate, a link connecting one end of said bracket to the frame of the vehicle, a pair of shoes pivotally mounted on said bracket, and an operating member pivotally mounted on said bracket and connected to the opposite end of said shoes.

2. In a device of the character described, a drum, a bracket mounted concentrically therewith and movable relative thereto, a pair of links pivotally mounted on said bracket, means for maintaining said links in parallelism, a shoe pivotally connected to the outer end of each of said links, and means for actuating said shoes.

3. In a device of the character described, a drum, a bracket mounted concentrically therewith and movable relative thereto, a pair of links pivotally mounted on said bracket, a rod pivotally connected to said links intermediate their ends, brake shoes pivotally connected to the opposite ends of said links, and means for actuating said brake shoes.

4. A device constructed in accordance with claim 3 wherein the ends of said rod are oppositely threaded to permit adjustment of said brake shoes.

5. The combination with a vehicle including a frame, an axle and a journal box therefor, of a brake including a brake drum rotatable with the axle, a bracket rotatably carried by the journal box and mounted in concentric relation relative to the axle, means pivotally connecting one end of the bracket to the frame, brake shoes carried by the opposite end of the bracket, and means for operating the brake shoes.

In testimony whereof I affix my signature.

LESLIE W. RICHARDS.